(12) United States Patent
Limber et al.

(10) Patent No.: US 6,536,727 B1
(45) Date of Patent: Mar. 25, 2003

(54) CHRISTMAS LIGHT CLIP

(75) Inventors: Jamie A Limber, Gilbert, AZ (US); Robert I. Vasquez, Phoenix, AZ (US)

(73) Assignee: The Christmas Light Company Inc., Mesa, AZ (US)

( * ) Notice: Subject to any disclaimer, the term of this patent is extended or adjusted under 35 U.S.C. 154(b) by 0 days.

(21) Appl. No.: 10/068,413

(22) Filed: Feb. 7, 2002

(51) Int. Cl.$^7$ ................................................ E04G 3/00
(52) U.S. Cl. ........................ 248/229.16; 248/227.1; 248/229.26
(58) Field of Search ................ 248/229.16, 229.26, 248/230.7, 48.1, 48.2, 227.1, 200; 24/339; D8/373; 362/396, 250, 287, 285, 430

(56) References Cited

U.S. PATENT DOCUMENTS

| | | | |
|---|---|---|---|
| 2,658,247 A | 11/1953 | Heuer | 24/73 |
| 3,124,327 A | 3/1964 | Meszaros | 248/74 |
| 3,181,827 A | 5/1965 | Sassin | 248/74 |
| 3,182,944 A | 5/1965 | Laviano | 248/226 |
| 3,189,310 A | 6/1965 | Trueson | 248/314 |
| 3,193,229 A | 7/1965 | Stock | 248/74 |
| 3,438,604 A | 4/1969 | Spicer | 248/74 |
| 3,540,687 A | 11/1970 | Cava | 248/316 |
| 3,578,282 A | 5/1971 | Olsen | 248/214 |
| 3,584,795 A | 6/1971 | Baird | 240/52 |
| 3,599,916 A | 8/1971 | Szabo | 248/73 |
| 3,599,918 A | 8/1971 | Patchett | 248/215 |
| 3,861,632 A | 1/1975 | Siilats | 248/223 |
| 3,883,926 A | 5/1975 | Reynolds | 24/73 |
| 4,491,902 A | 1/1985 | Cangelosi | 362/389 |
| D298,738 S | 11/1988 | Rumpel | D8/395 |
| 4,851,977 A | 7/1989 | Gary | 362/249 |
| 4,905,131 A | 2/1990 | Gary | 362/249 |
| D316,958 S | 5/1991 | Rumpel | D8/395 |
| D317,115 S | 5/1991 | Gary | D8/373 |
| D317,252 S | 6/1991 | Rumpel | D8/395 |
| D319,575 S | 9/1991 | Young | D8/395 |
| 5,056,747 A | 10/1991 | Kireta | 248/231.8 |
| D324,990 S | 3/1992 | Gary | D8/354 |
| D325,866 S | 5/1992 | Gary | D8/354 |
| 5,141,192 A | 8/1992 | Adams | 248/231.8 |
| D331,360 S | 12/1992 | Adams | D8/373 |
| 5,249,108 A | 9/1993 | Gary | 362/288 |
| 5,388,802 A | 2/1995 | Dougan et al. | 248/74.2 |
| D356,246 S | 3/1995 | Adams | D8/395 |
| D356,492 S | 3/1995 | Adams | D8/395 |
| 5,496,005 A | 3/1996 | Dieringer | 248/74.2 |
| D369,957 S | 5/1996 | Blanton | D8/373 |
| 5,531,411 A | 7/1996 | Adams | 248/65 |
| 5,542,636 A | 8/1996 | Mann et al. | 248/29.26 |
| 5,544,031 A | 8/1996 | Blanton | 362/396 |
| 5,566,058 A | 10/1996 | Protz. Jr. | 362/396 |
| D376,535 S | 12/1996 | Gary et al. | D8/395 |
| D376,973 S | 12/1996 | Brown | D8/395 |
| 5,581,956 A | 12/1996 | Fennessy et al. | 52/28 |
| 5,607,230 A | 3/1997 | Protz, Jr. | 362/396 |
| 5,609,415 A | 3/1997 | Protz, Jr. | 362/396 |
| 5,669,709 A | 9/1997 | Adams | 362/396 |
| 5,695,159 A | 12/1997 | Adams | 248/71 |
| 5,772,166 A | 6/1998 | Adams | 248/231.81 |
| 5,921,511 A | 7/1999 | LaPointe | 248/73 |
| D414,291 S | 9/1999 | Gary et al. | D26/138 |
| D424,418 S | 5/2000 | Gary et al. | D8/395 |
| D424,419 S | 5/2000 | Avinger | D8/395 |
| D427,510 S | 7/2000 | Gary et al. | D8/395 |
| 6,076,938 A | 7/2000 | Kinderman | 362/249 |
| 6,182,933 B1 | 2/2001 | Rapp | 248/231.8 |

*Primary Examiner*—Ramon O. Ramirez
(74) *Attorney, Agent, or Firm*—The Halvorson Law Firm

(57) ABSTRACT

Described is a clip that is useful for attaching ornamental light strings to surfaces, such as roofs, walls, fascia and the like. The clip can be attached to a variety of different surfaces, such as gutters, roofs, and roof fascia. The clip comprises a clip portion and two different light string attachment portions, one located on each side of the clip portion.

14 Claims, 6 Drawing Sheets

CHRISTMAS LIGHT CLIP

FIELD OF THE INVENTION

The present invention relates to the field of devices for the attachment of ornamental light strings to surfaces, such as gutters and fascia of buildings.

BACKGROUND

Ornamental decoration of buildings during different holiday seasons is an increasingly popular past time for people. Much of the ornamental decoration is in the form of ornamental light strings, such as the well known Christmas light strings. Popular locations for these ornamental light strings are gutters, roofs, roof fascia and eaves. Since these decorations are usually only applied for a few weeks, there is a need and demand for devices that allow the easy and removable attachment of these ornamental light strings.

SUMMARY OF INVENTION

It is an object of the present invention to provide a device that allows for the easy and removable attachment of electrical strings, such as ornamental light strings to surfaces such as gutters, roofs, roof fascia and eaves.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION OF PREFERRED EMBODIMENTS

Figure 1:
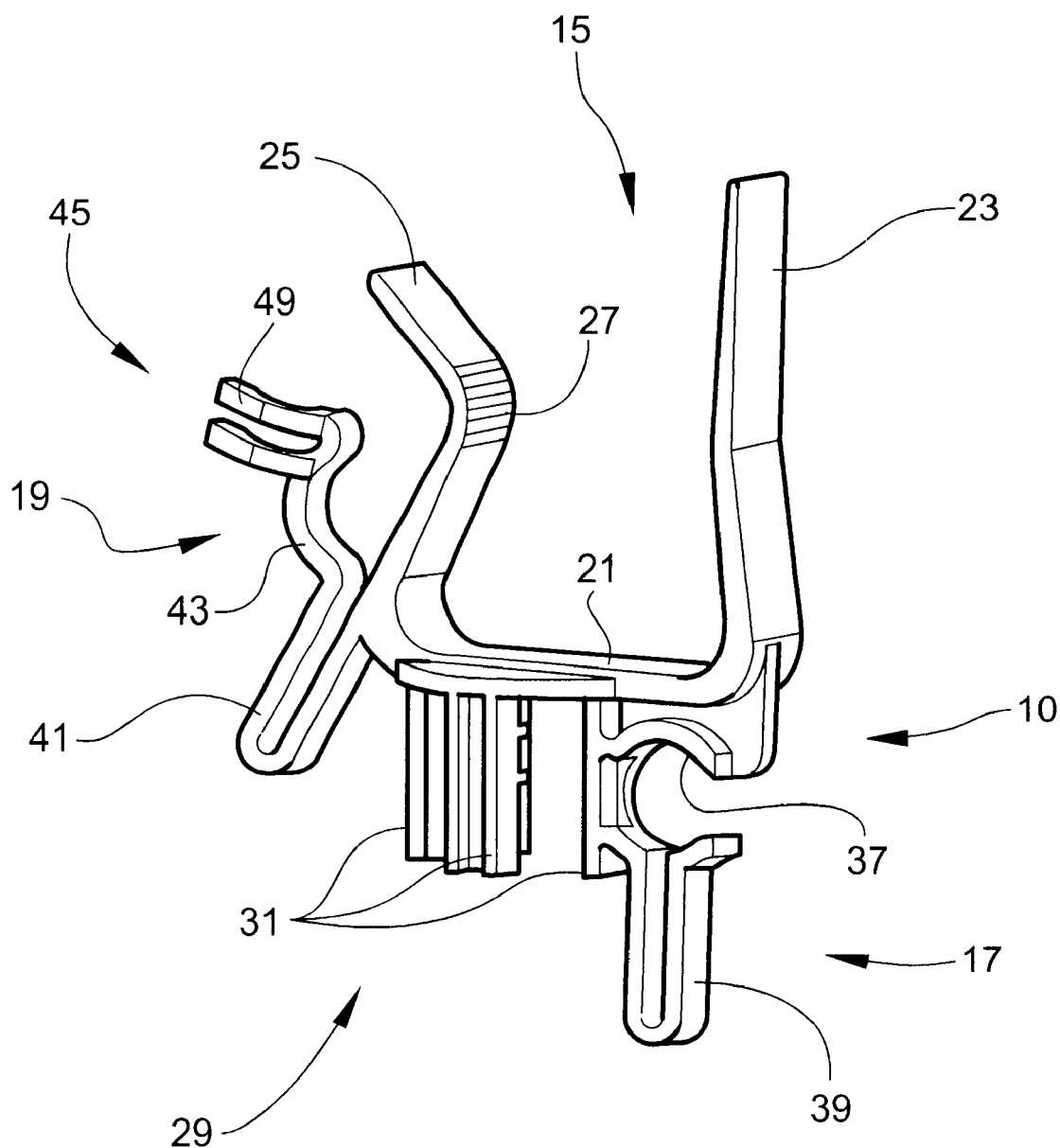
FIG. 1 perspective view of the present invention.
Figure 2:
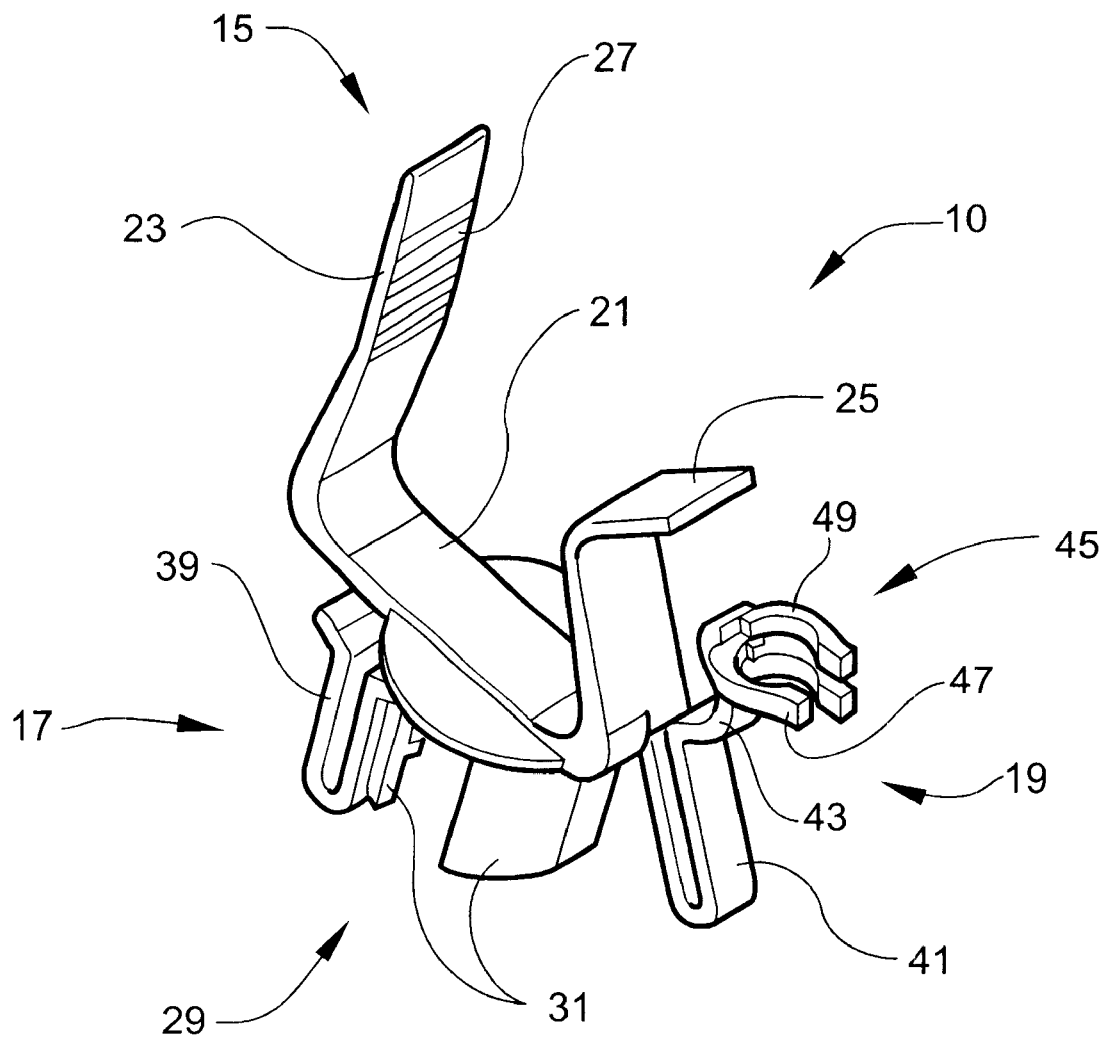
FIG. 2 is a second perspective view of the present invention.
Figure 3:
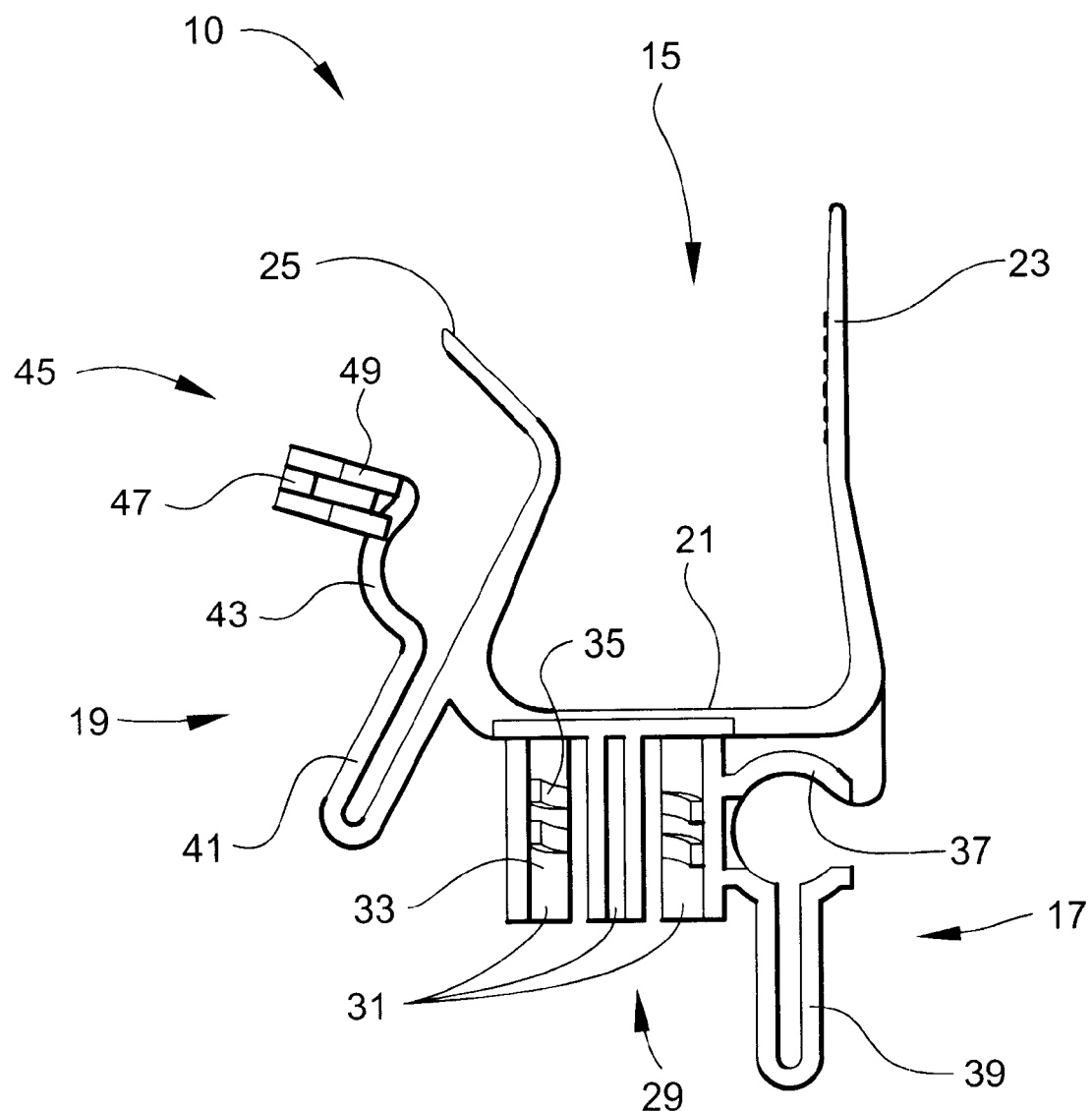
FIG. 3 is a side view of the present invention.
Figure 4:
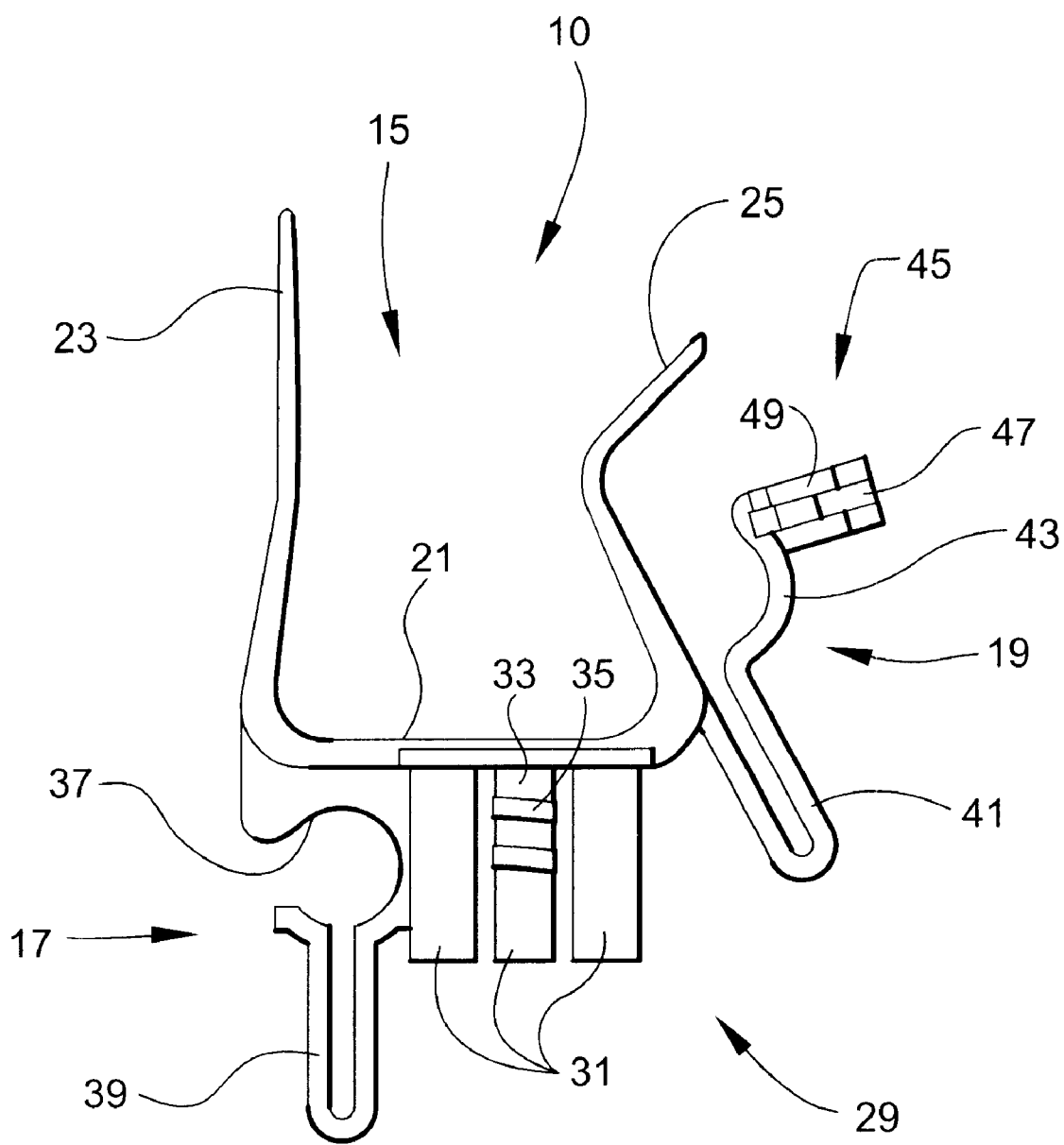
FIG. 4 is a second side view of the present invention.
Figure 5:
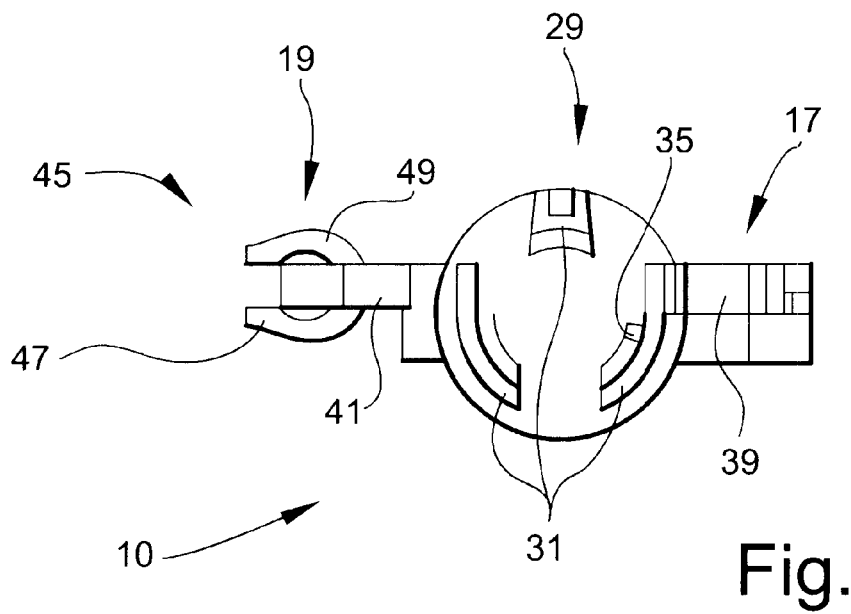
FIG. 5 is a bottom view of the present invention.
Figure 6:
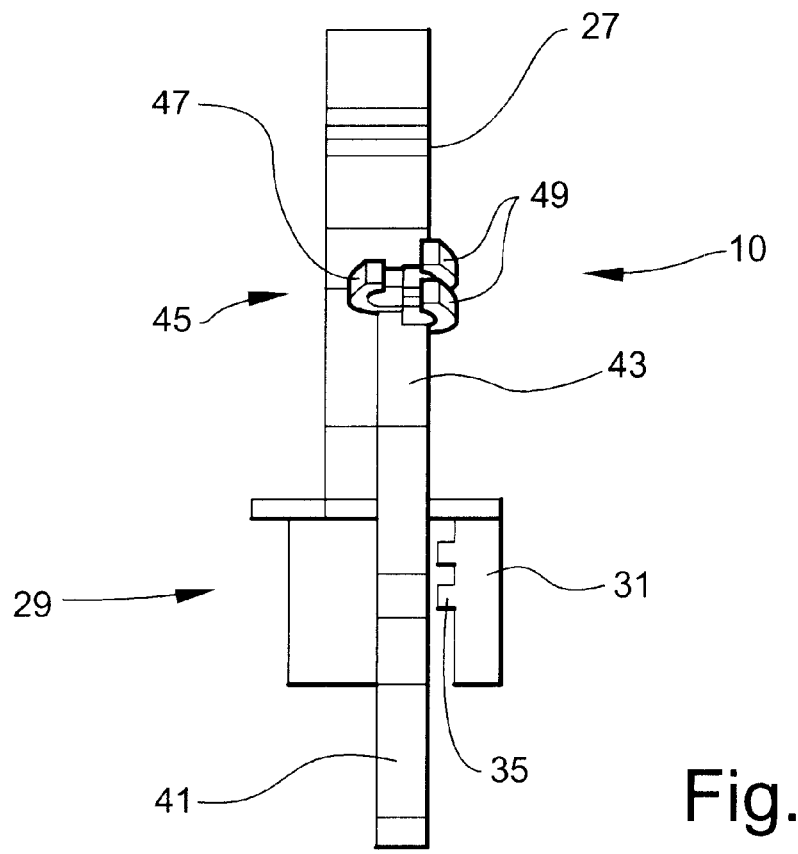
FIG. 6 is a front view of the present invention.
Figure 7:
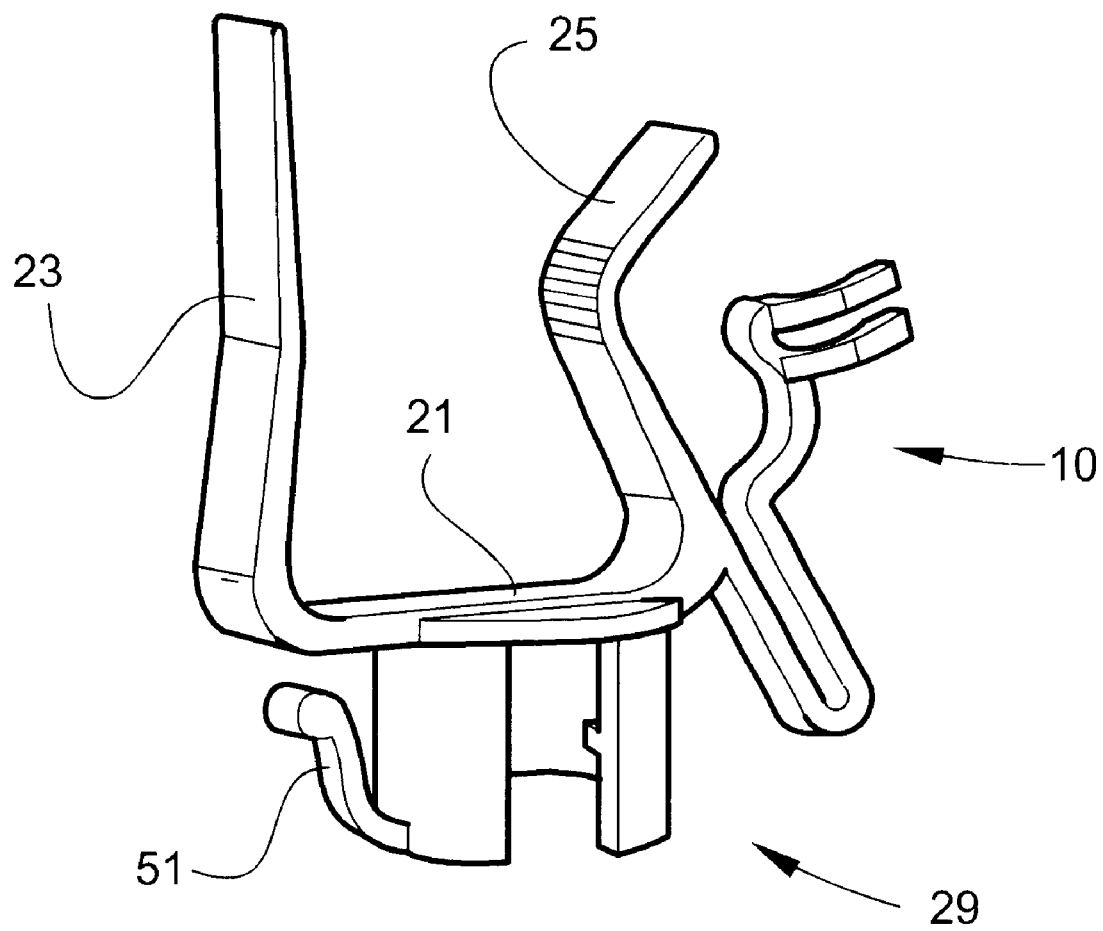
FIG. 7 is an alternate embodiment of the present invention.

The present invention is useful for attaching ornamental light strings to surfaces, such as roofs, walls, fascia and the like.

With reference to the figures, the present invention is a clip 10 that can be attached to a variety of different surfaces, such as gutters, roofs, roof fascia and eaves, shingles and the like. The clip 10 comprises a clip portion 15 and two different light string attachment portions, 17 and 19, one located on each side of the clip portion 15.

The clip portion 15 is substantially U-shaped having a bottom section 21, a first leg section 23, and a second leg section 25. In the preferred embodiment, the first leg section 23 is substantially perpendicular to the bottom section 21. Even more preferred, the first leg section 23, while being substantially perpendicular to the bottom section 21, includes a slight angle or bend (with the apex of the bend/vertex of the angle being directed toward the second leg section 25). Like the first leg section 23, the second leg section 25 is generally perpendicular to the bottom section 21. However it is preferred that the second leg section 25 includes a light angle or bend (with the apex of the bend/vertex of the angle being directed toward the first leg section 23), but being greater in magnitude than the slight angle or bend in the first leg section 23. Since it is preferred that the clip portion 15 be made from a slightly flexible material, such as plastics and polymers, the bends in the first and/or second leg sections, 23 and 25, provide a biasing force that acts on anything inserted between them, such as a gutter or roof fascia. Further, in the preferred embodiment, the first leg section 23 is greater in length than the second leg section 25 since the greater lengths act as a guide and allows for easier installation.

In one embodiment, the first and second leg sections 23 and 25, include at least one rib or barb, 27, located on the inward surface of the apex of the slight bend or angle. These at least one rib or barb, 27, are provided to increase the resistance of the clip portion 15 to unwanted movement.

The clip portion 15 further comprises a pole cap section 29. The pole cap section 29 is at least two, preferably three, concave sections 31 that project downward from the bottom section 21. These concave sections 31 are located to provide an interrupted cylindrical form. On inside surfaces 33 of the concave section 31 are at least one, preferably two or more thread sections 35. These thread sections 35 are provided to allow the pole cap section 29 to be threadingly received by a pole having threads at a distal end.

In use, a threaded pole is screwed into the pole cap section 29. The user then attaches the clip portion 15 to a surface, such as a gutter or roof fascia by forcing the first and second leg sections 23 and 25 around the gutter or roof fascia. Once the clip portion has been placed, the user then unscrews the threaded pole from the pole cap section 29, thereby leaving the clip 10 attached to the surface. Removal of the clip 10 is merely the reverse of the above. The first light string attachment portion 17 is located in the angle between the pole cap section 29 and the bottom section 21, adjacent the first leg 23. The first light string attachment portion 17 comprises a substantially C-shaped clip 37. In a preferred embodiment, the clip 37 includes a first flex segment 39 located near one end of the C-shape. This flex segment 39 allows the diameter of the clip 37 to be expanded in order to receive differently sized items, such as ornamental light bulb sockets. Additionally, since the preferred embodiment of the flex segment 39 is a substantial U-shape, the U of the flex segment 39 may receive and hold electrical strings, such as those used with ornamental light strings. The inclusion of the flex segment 39 makes the first light string attachment portion a multi-use element.

The second light string attachment portion 19 is located on the second leg 25. The second light string attachment portion 19 comprises a flex section 41 that extends from the attachment point of the second leg section 25 and the bottom section 21. This second flex section 41, like the first flex section 39, has a substantially U-shape (one terminal end of the U-shape being attached to the attachment point of the second leg section 25 and the bottom section 21). Attached to a free terminal end of the flex section 41 is an arcuately shaped gripping arm 43. The gripping arm 43, working in conjunction with the flex section 41 provide a variable diameter holder for ornamental lightbulb sockets (similar to the clip 37 of the first light string attachment section 17). Also, similar to the first flex section 39 the U-shape of the second flex section 41 may receive and hold electrical strings, such as those used with ornamental light strings. The inclusion of this second flex segment 41 makes the first light string attachment portion a multi-use element.

In one embodiment, the second light string attachment section 19 may include a three prong gripping clip 45. This three prong gripping clip 45 comprises one arcuately shaped arm 47 that faces two opposite arcuately shaped arms 49. In the preferred embodiment, the diameter defined by the arcuate shapes of the gripping arms is smaller than the diameter of the arcuately shaped gripping arm 43. In this way, light bulb sockets small than those that may be secured by the gripping arm 43 may be received and secured.

Finally, in an alternate embodiment, the first and second light string attachment portions 17 and 19, may be omitted and a single hook 51, for receiving electrical strings or small slight bulb sockets, may be attached and located on one of the concave sections 31 of the pole cap section 29. The location of the hook 51 may be changed to other outside surfaces of the clip 10 and alternate locations are considered to fall within the scope of the present invention.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A device for securing ornamental light strings to surfaces comprising a clip portion and a hook attached to the clip portion; said clip portion further comprising a back section, a first leg section and a second leg section, the first and second leg sections further being substantially perpendicular to the back section and where the clip portion further comprises a pole cap portion that is further comprised of at least two arcuately shaped sections, the at least two arcuately shaped sections located on a bottom surface of the bottom section and defining a cylindrical shape.

2. The device according to claim 1 wherein the at least two arcuately shaped section further include thread sections located on inside surfaces thereof.

3. The device according to claim 2 wherein the first and second leg sections further comprise a slight bend, with the vertex of the slight bend directed inward.

4. A device for securing ornamental light strings to surfaces comprising a clip portion, a first light string attachment portion, and a second light string attachment portion, both attached to the clip portion; said clip portion further comprising a back section, a first leg section and a second leg section, the first and second leg sections further being substantially perpendicular to the back section and where the clip portion further comprises a pole cap portion that is further comprised of at least two arcuately shaped sections, the at least two arcuately shaped sections located on a bottom surface of the bottom section and defining a cylindrical shape.

5. The device according to claim 4 wherein the at least two arcuately shaped section further include thread sections located on inside surfaces thereof.

6. The device according to claim 5 wherein the first and second leg sections further comprise a slight bend, with the vertex of the slight bend directed inward.

7. The device according to claim 4 wherein the first light string attachment portion is located adjacent the first leg section and further comprises a substantially C-shaped clip.

8. The device according to claim 7 wherein the first light string attachment portion further comprises a first flex segment located near one end of the C-shaped clip.

9. The device according to claim 8 wherein the clip portion further comprises a pole cap portion that is further comprised of at least two arcuately shaped sections, the at least two arcuately shaped sections located on a bottom surface of the bottom section and defining a cylindrical shape.

10. The device according to claim 9 wherein the at least two arcuately shaped section further include thread sections located on inside surfaces thereof.

11. The device according to claim 4 wherein the second light string attachment portion is located on the second leg section and further comprises a substantially U-shaped flex section that extends from the attachment point of the second leg section and the bottom section and an arcuately shaped gripping arm attached to a free terminal end of the flex section.

12. The device according to claim 11 wherein the second light string attachment portion further comprises a three prong gripping clip comprising one arcuately shaped arm that faces two opposite arcuately shaped arms, said three prong gripping clip located at a terminal end of the arcuately shaped gripping arm attached to the free terminal end of the flex section.

13. The device according to claim 12 wherein the clip portion further comprises a pole cap portion that is further comprised of at least two arcuately shaped sections, the at least two arcuately shaped sections located on a bottom surface of the bottom section and defining a cylindrical shape.

14. The device according to claim 13 wherein the at least two arcuately shaped section further include thread sections located on inside surfaces thereof.

* * * * *